United States Patent
Lo et al.

(10) Patent No.: US 10,040,140 B2
(45) Date of Patent: Aug. 7, 2018

(54) NOZZLE FOR CONNECTING OR DISCONNECTING SOLDER JOINTS BETWEEN HEAD BONDING PADS IN A HARD DISK DRIVE, AND LASER SOLDERING OR REFLOWING TOOL WITH THE SAME

(71) Applicant: SAE Magnetics (H.K.) Ltd., Hong Kong (CN)

(72) Inventors: Chiwai Lo, Hong Kong (CN); Shenkuang Chou, Hong Kong (CN); Yiusing Ho, Hong Kong (CN); Kayip Wong, Hong Kong (CN); Xiangyuan Tan, DongGuan (CN); Junqun Zhang, DongGuan (CN)

(73) Assignee: SAE MAGNETICS (H.K.) LTD., Hong Kong (CN)

(*) Notice: Subject to any disclaimer, the term of this patent is extended or adjusted under 35 U.S.C. 154(b) by 532 days.

(21) Appl. No.: 14/584,223

(22) Filed: Dec. 29, 2014

(65) Prior Publication Data

US 2016/0184915 A1 Jun. 30, 2016

(51) Int. Cl.
*B23K 26/00* (2014.01)
*B23K 3/06* (2006.01)
*B23K 1/005* (2006.01)
*B23K 1/00* (2006.01)

(52) U.S. Cl.
CPC .......... *B23K 3/0623* (2013.01); *B23K 1/0016* (2013.01); *B23K 1/0056* (2013.01)

(58) Field of Classification Search
CPC .... B23K 1/018; B23K 1/0016; B23K 1/0056; B23K 2201/36–2201/42; B23K 3/029; B23K 3/0623; B23K 3/0638
USPC ..... 219/85.12, 85.13, 121.6, 121.63–121.66, 219/121.84, 121.85
See application file for complete search history.

(56) References Cited

U.S. PATENT DOCUMENTS

| | | | |
|---|---|---|---|
| 2007/0012749 A1* | 1/2007 | Yamaguchi | B23K 3/0623 228/179.1 |
| 2008/0179299 A1* | 7/2008 | Fukaya | B23K 1/0056 219/121.63 |
| 2013/0256281 A1* | 10/2013 | Tsuchiya | B23K 26/1464 219/121.64 |
| 2015/0364446 A1* | 12/2015 | Azdasht | B23K 1/0016 257/774 |

* cited by examiner

*Primary Examiner* — Dana Ross
*Assistant Examiner* — Brandon Harvey
(74) *Attorney, Agent, or Firm* — Nixon & Vanderhye PC

(57) ABSTRACT

A nozzle for connecting or disconnecting solder joints between head bonding pads of in a hard disk drive, includes a nozzle body including a tip, the tip disposed at a distal end of the nozzle body and configured to deliver or reflow a solder ball in proximity to head bonding pads; and a central duct disposed along a central axis of the nozzle body and configured to convey the solder ball to or from the tip. The tip includes a front face facing to a trailing edge of a slider, a back face facing to a top surface of a suspension supporting the slider, and two side faces adjacent to the front face and back face respectively, and at least one interference-free structure is provided at two adjacent faces of the tip at least, thereby no interference happens between the tip and elements adjacent to the slider during the operation.

8 Claims, 20 Drawing Sheets

NOZZLE FOR CONNECTING OR
DISCONNECTING SOLDER JOINTS
BETWEEN HEAD BONDING PADS IN A
HARD DISK DRIVE, AND LASER
SOLDERING OR REFLOWING TOOL WITH
THE SAME

FIELD OF THE INVENTION

The present invention relates to a nozzle for connecting or disconnecting solder joints between head bonding pads in a hard disk drive and, more particularly, to a solder-jet nozzle or a solder-reflow nozzle for solder joints between head bonding pads of a head gimbal assembly (HGA) for a hard disk drive (HDD).

BACKGROUND OF THE INVENTION

Hard disk drives are information storage devices that use thin film magnetic media to store data. Referring to FIG. 1a, a typical hard disk drive 1 in prior art comprises a head stack assembly (HSA) 10 with slider 11 (shown in FIG. 1b) thereon, a magnetic disk 12 mounted on a spindle motor 13 which causes the magnetic disk 12 to spin, and a motor base 14 to enclose the above-mentioned components.

The slider 11 flies over the surface of the magnetic disk 12 at a high velocity to read data from or write data to concentric data tracks on the magnetic disk 12, which is positioned radially by a voice coil 15 embedded (e.g. by epoxy potting or overmolding) in a fantail spacer 16 of the HSA 10.

Referring to FIG. 1b, a traditional HSA 10 includes an actuator coil assembly (ACA) 101, a fantail spacer 16 interposed in the ACA 101 via the voice coil 15, at least an HGA 102 connected with the ACA 101, and a controlling circuit 140 for controlling the HGA 102. The ACA 101 has at least one top surface 131 for mounting the HGA 102, and a side surface 132 for mounting the control circuit 140.

As shown in FIG. 1b, the controlling circuit 140 is a flexible printed circuit assembly (FPCA) that includes a printed circuit board assembly (PCBA) 141 for connecting with a preamplifier (not shown) and a flexible printed circuit (FPC) 142 connecting with the PCBA 141. And the FPC 142 electrically connects to the HGA 102, and mounts on the side surface 132 of the ACA 101. The HGA 102 includes a suspension 190 and a slider 11 supported by the suspension 190.

Nowadays, as the demands for excellent performance for the sliders become more and more higher, the slider and its accessorial elements are increased, which requires the structure become much compact. For example, for improving the flying performance of the slider, a micro dual stage actuator (μDSA) for fine read/write positioning is developed which includes two piezoelectric arms positioned at and connected to two sides of the slider, and the piezoelectric arms are controlled by the circuit on the trace. When actuated, the piezoelectric arms will be expanded or contracted so as to fine tune the position of the slider to obtain the desired position. For another example, a thermal-assisted magnetic recording (TAMR) slider is also developed for improving the writing performance of the slider, and the TAMR slider includes a laser diode unit (LDU) formed adjacent to the read/write head, generally located at an opposite surface of the air bearing surface (ABS). In some conditions, it's a potential that the LDU is located at two sides of the slider as the piezoelectric arms. By this token, such accessorial elements bring the complicated HGA, which increases difficulty for laser bonding between the bonding pads of the slider and the suspension, or solder reflowing operation.

FIG. 2a shows a partial view of a HGA with μDSA or LDU 180 located at both sides of the slider 11, and a row of first bonding pads 111 is connected on the trailing edge 11a of the slider 11, and a plurality of second bonding pads 191 are formed on the suspension 190 (not shown in this figure) accordingly. Solder joints 161 are formed between the bonding pads 111 and 191 by using a soldering device. Such bonding pads may be called as head bonding pads. FIG. 2b shows a solder-jet nozzle 170 to explain how to connect the slider 11 and the suspension 190 with jetting solders from the solder-jet nozzle. Concretely, the solder-jet nozzle 170 is positioned in proximity to the trailing edge 11a of the slider 11 to jet the solder. Owing to limited space between the μDSA 180 and the bonding position, interference (shadow portion as shown in FIG. 2b) between the tip 170a of the solder-jet nozzle 170 and the μDSA is generated during bonding, as shown the enlarged view in FIG. 2b, which causes some pollutions or damages on the μDSA 180. To avoid it, the solder-jet nozzle 170 has to be moved far away from the slider 11 during bonding, which reduces the precision and alignment for soldering and reducing the assembly yield however. Specially, the disadvantages are even obvious for fine-pitch bonding pads connection (11 or 13 pads).

Similarly, the same problems may be generated for a solder-reflow nozzle 160 during operation, as shown in FIG. 2c.

Therefore, there is a need for an improved a nozzle for connecting or disconnecting solder joints between head bonding pads in a hard disk drive to overcome the drawbacks mentioned above.

SUMMARY OF THE INVENTION

One aspect of the present invention is to provide a nozzle for connecting or disconnecting solder joints between head bonding pads of a head gimbal assembly for a hard disk drive, which avoids interference between the tip of the nozzle and elements adjacent to the slider during the soldering operation, and maintains a safe and suitable clearance to obtain high precision and high speed connection or disconnection of solder joints.

One aspect of the present invention is to provide a laser soldering or reflowing tool for connecting or disconnecting solder joints between head bonding pads of a head gimbal assembly for a hard disk drive, which avoids interference between the tip of the nozzle and elements adjacent to the slider during the soldering operation, and maintains a safe and suitable clearance to obtain high precision and high speed connection or disconnection of solder joints.

To achieve above objective, a nozzle for connecting or disconnecting solder joints between head bonding pads of a head gimbal assembly for a hard disk drive, includes:

a nozzle body including a tip, the tip disposed at a distal end of the nozzle body and configured to deliver or reflow a solder ball in proximity to head bonding pads of a head gimbal assembly; and a central duct disposed along a central axis of the nozzle body and configured to convey the solder ball to or from the tip; the tip when positioned in proximity to the head bonding pads comprises a front face facing to a trailing edge of a slider, a back face facing to a top surface of a suspension supporting the slider, and two side faces adjacent to the front face and back face respectively, and at least one interference-free structure is provided at two adjacent faces of the tip at least, thereby no interference happens between the tip and elements adjacent to the slider during the operation.

Preferably, the interference-free structure includes a chamfer-cut formed on the side faces of the tip.

As a preferred embodiment, the interference-free structure is a step-cut formed on the side faces of the tip.

Preferably, the interference-free structure further includes a step-cut formed on the outermost of the chamfer-cut.

Preferably, an angle between the chamfer-cut and the central axis of the nozzle body is in a range of approximately 20°-40°.

More preferably, an angle between the chamfer-cut and the central axis of the nozzle body is in a range of approximately 15°-30°.

Preferably, the step-cut has a depth in a range of approximately 0.10 mm-0.25 mm.

Preferably, the nozzle is adapted for the slider having piezoelectric elements or laser diode units on sides of the slider.

As another preferred embodiment, the front face and the back face are chamfered surfaces.

A laser soldering or reflowing tool for connecting or disconnecting solder joints between head bonding pads of a head gimbal assembly for a hard disk drive, includes:
a laser; and
a nozzle which includes: a nozzle body including a tip, the tip disposed at a distal end of the nozzle body and configured to deliver or reflow a solder ball in proximity to head bonding pads of a head gimbal assembly; and a central duct disposed along a central axis of the nozzle body and configured to convey the solder ball to or from the tip; the tip when positioned in proximity to the head bonding pads comprises a front face facing to a trailing edge of a slider, a back face facing to a top surface of a suspension supporting the slider, and two side faces adjacent to the front face and back face respectively, and at least one interference-free structure is provided at two adjacent faces of the tip at least, thereby no interference happens between the tip and elements adjacent to the slider during the operation.

In comparison with the prior art, the present invention provides a nozzle with interference-free structure. Owing to the interference-free structures (chamfer-cut and or step-cut) are formed on the tip of the nozzle body, thus the width and the outer circumference of the tip are reduced by comparison with the prior art and with no damage to the central duct. Such that, the tip does not interfere with the elements/portion (such as μDSA, LDU, trailing edge, and the like) adjacent to the slider, during the solder bonding or reflowing. As such, the safety clearance between the tip and the elements/portions adjacent to the slider can be maintained, which improves the precision and alignment for soldering or reflowing, improves the assembly efficiency and yield for the HGA therefore, and saves assembly or manufacturing cost meanwhile.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective exploded view of a HSA of the hard disk drive shown in FIG. 1a;

DETAILED DESCRIPTION OF ILLUSTRATED EMBODIMENTS

Figure 1A:
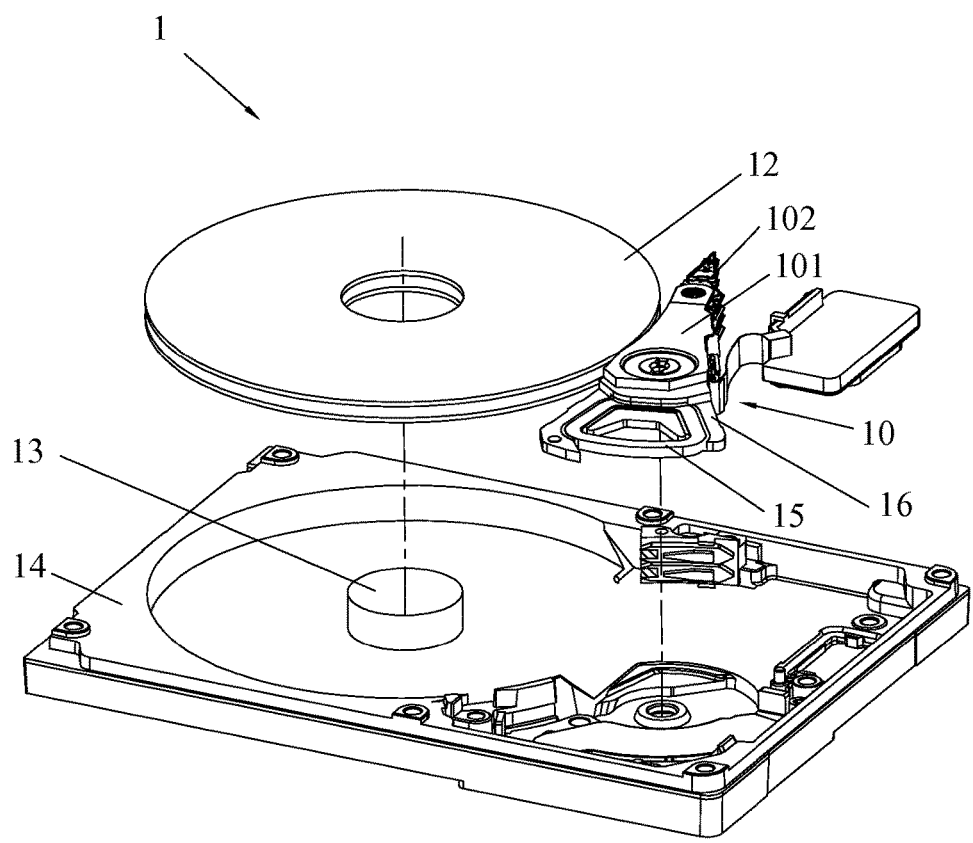
FIG. 1a is a perspective exploded view of a conventional hard disk drive.
Figure 1B:
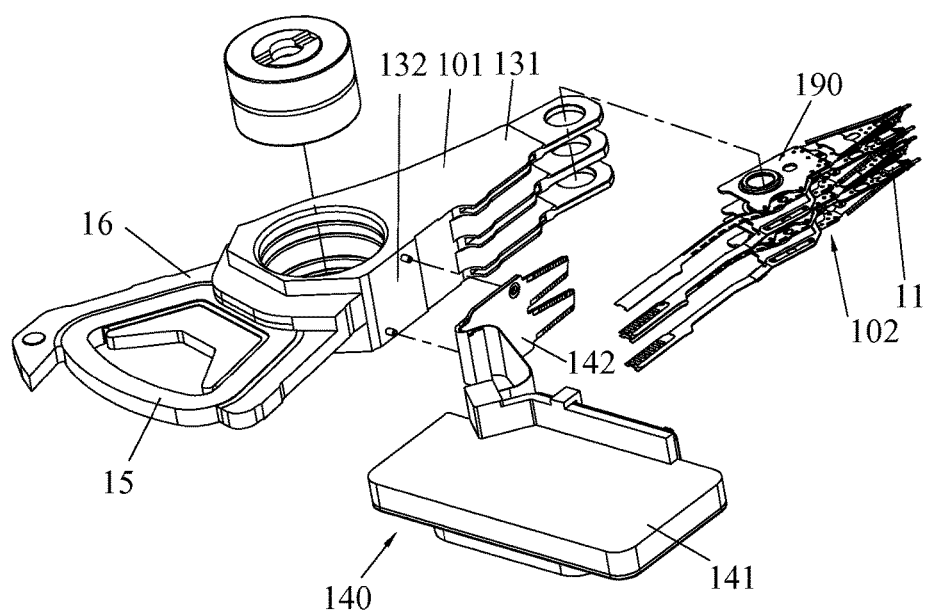
Figure 2A:
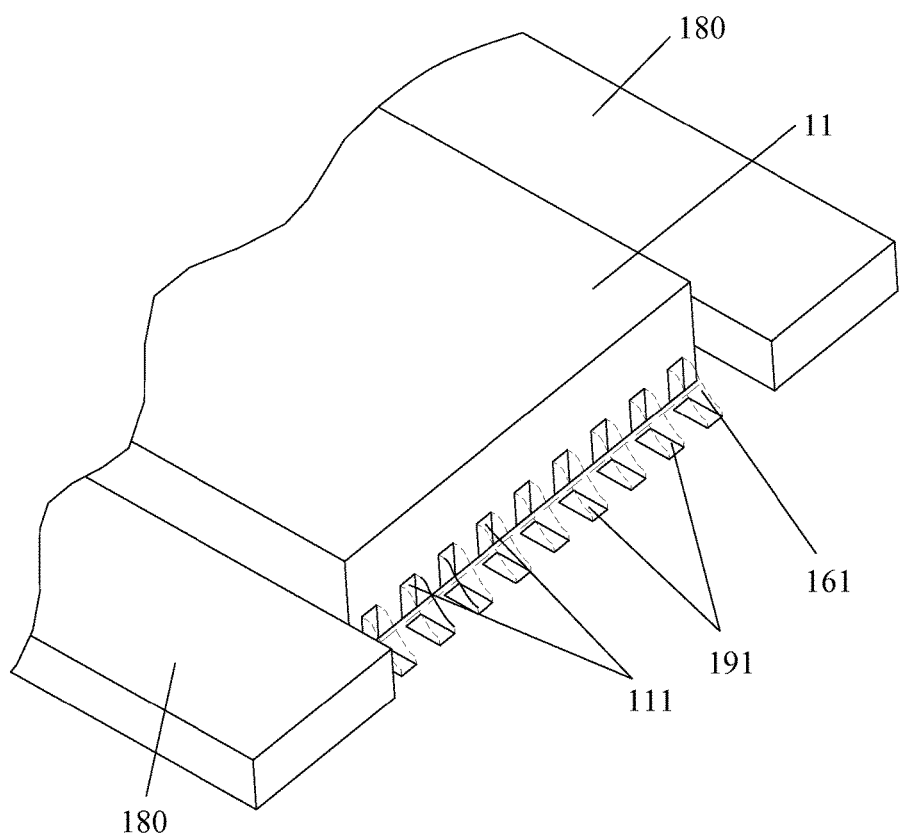
FIG. 2a is a partial view of a HGA which shows a slider with μDSA or LDU at both sides.
Figure 2B:
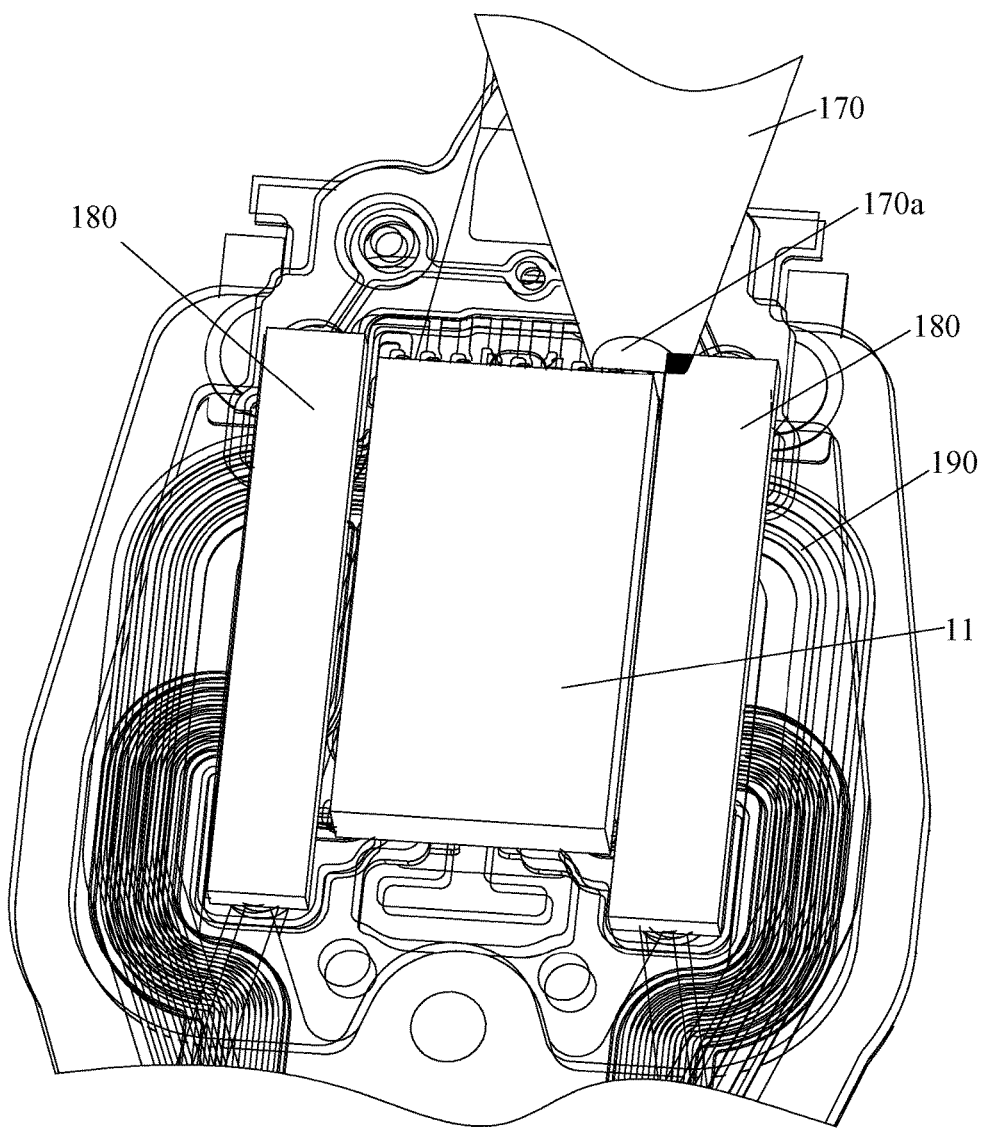
FIG. 2b shows a solder-jet nozzle to connect the slider and the suspension with jetting solders.
Figure 2C:
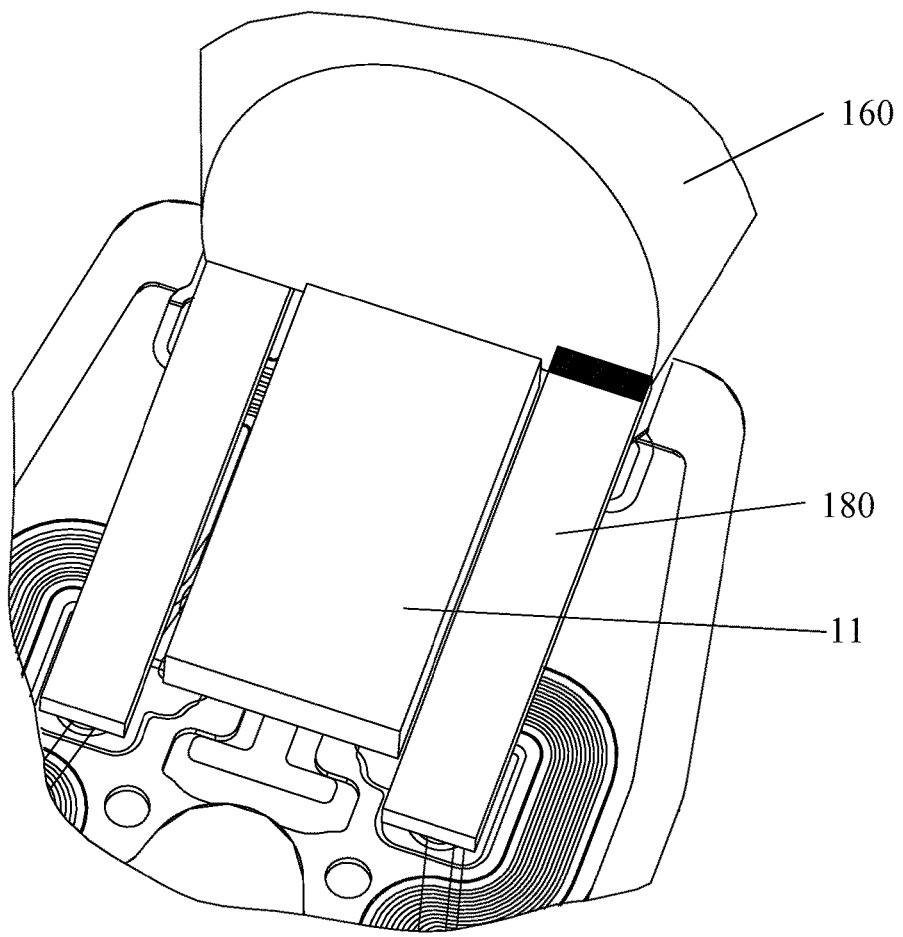
FIG. 2c is similar to FIG. 2b, except that it shows a solder-reflow nozzle as opposed to a shows a solder-jet nozzle.

Various preferred embodiments of the invention will now be described with reference to the figures, wherein like reference numerals designate similar parts throughout the various views. As indicated above, the invention is directed to a solder-jet nozzle, a solder-reflow nozzle and a laser soldering or reflowing tool for connecting or disconnecting solder joints between head bonding pads of a head gimbal assembly for a hard disk drive, which avoids interference between the tip of the nozzle and elements adjacent to the slider during the soldering operation, and maintains a safe and suitable clearance to obtain high precision and high speed connection or disconnection of solder joints.

In this invention, the interference-free structure configured on the tip of the nozzle body is adapted for both solder-jet nozzle and solder-reflow nozzle, and the details will be described, infra. The nozzle according to the present invention is not only applicable to connect or disconnect the head bonding pads of the HGA in the HDD, of course, to any bonding pads connection or disconnection in the HDD but also. The advantages applied in the head bonding pads are outstanding. The detailed structure of HDD is well known to the person ordinarily skilled in the art and therefore omitted here, and the general description for the slider with μDSA or LDU is shown as following.

Figure 3:
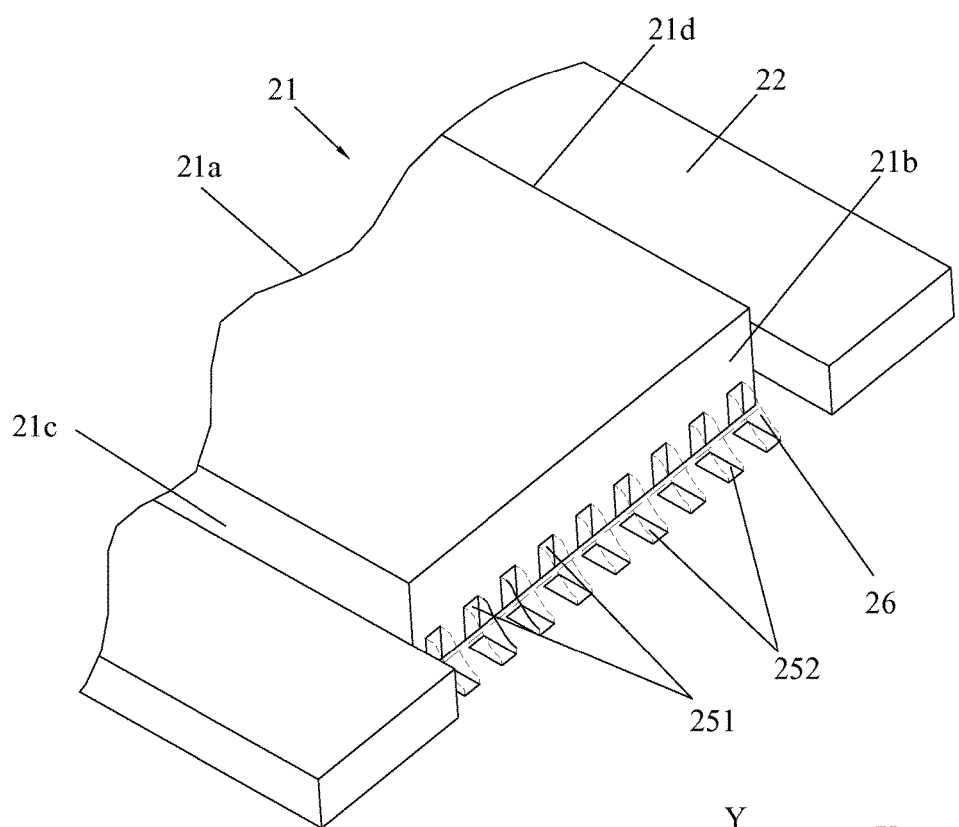
FIG. 3 is an enlarged perspective view that schematically depicts a slider with μDSA or LDU disposed on the suspension of HGA.
Figure 4A:
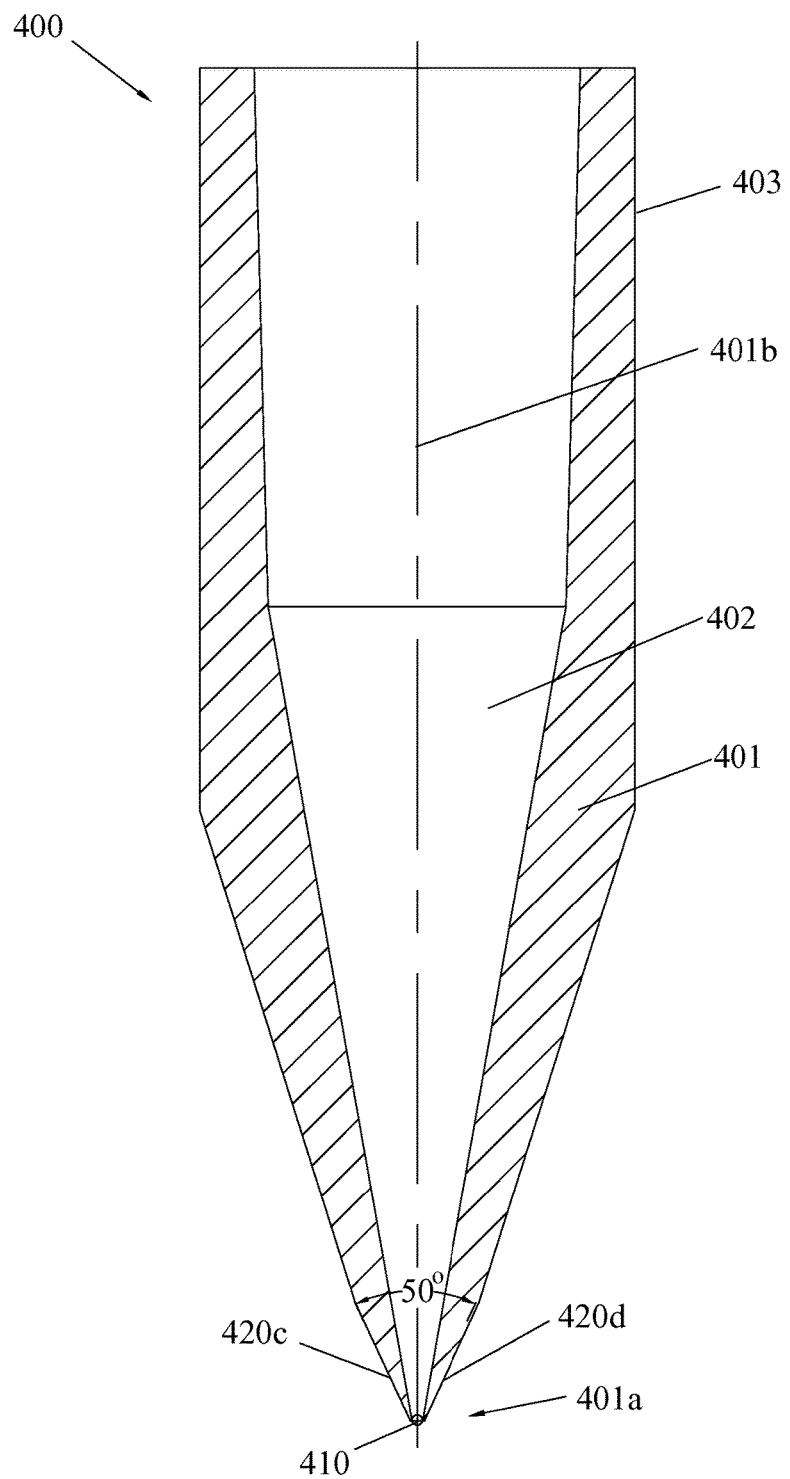
FIG. 4a is a cross section view of the solder-jet nozzle according to a first embodiment of the present invention.
Figure 4B:
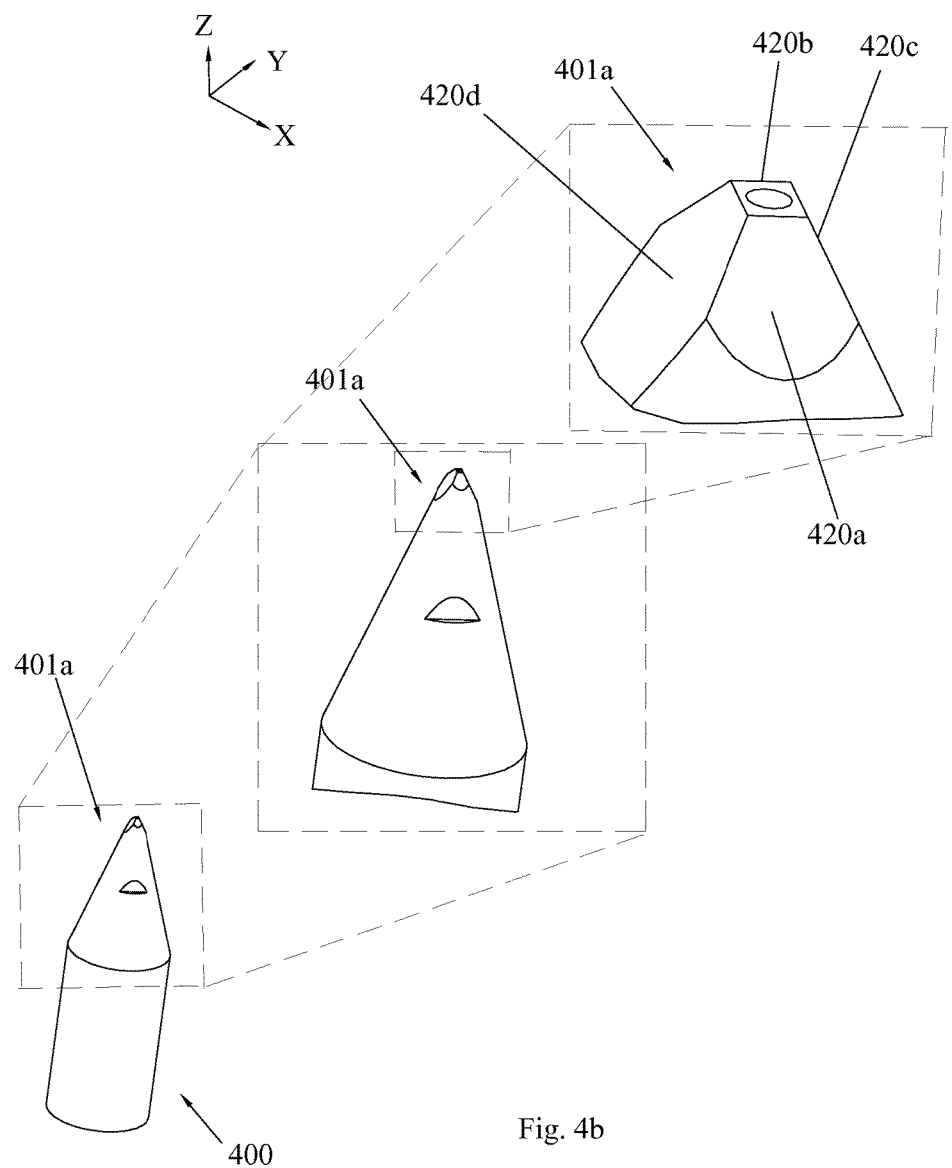
FIG. 4b is a partial perspective view of a solder-jet nozzle according to the first embodiment of the present invention.
Figure 4C:
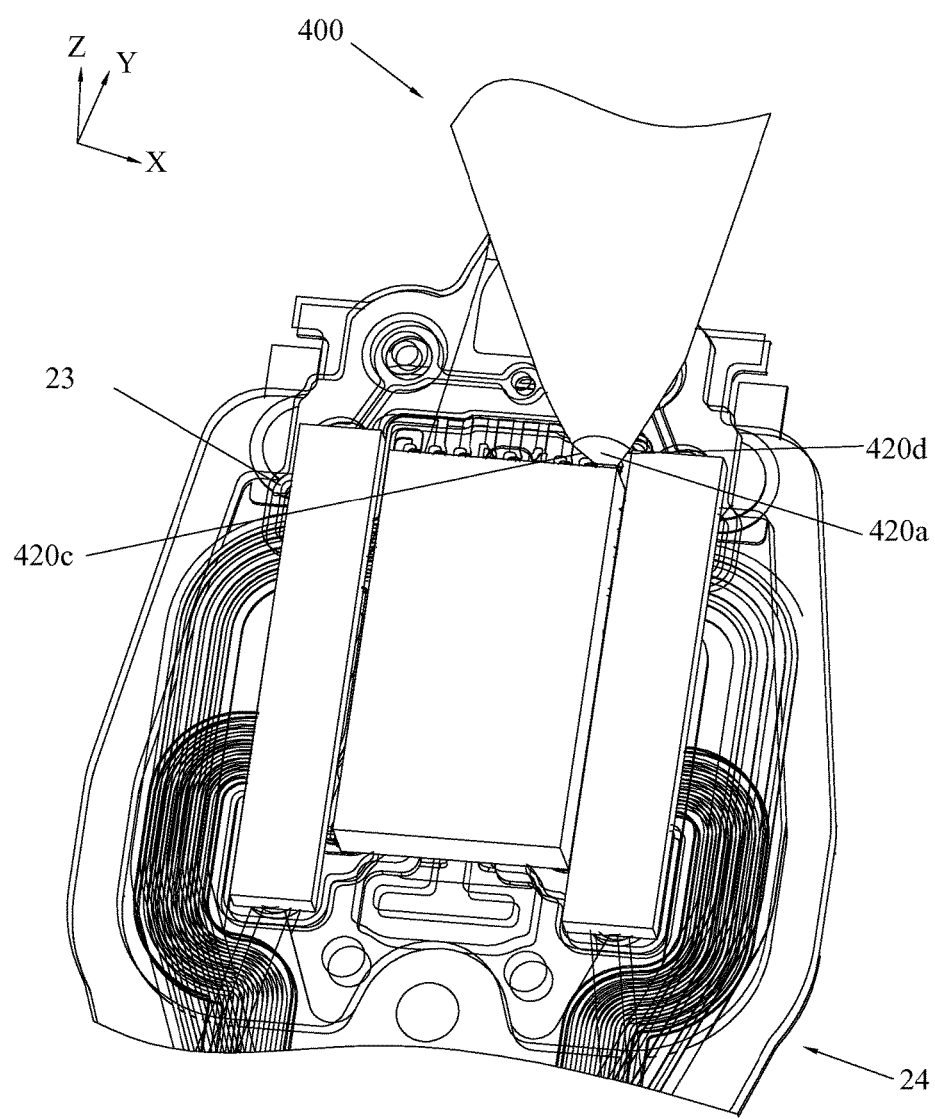
FIG. 4c is a drawing that shows the solder-jet nozzle according to the embodiment performs the solder bonding between the head bonding pads.

FIG. 3 is an enlarged perspective view that schematically depicts a slider 21 with μDSA or LDU 22 disposed on the suspension 23 of HGA 24 (referring to FIG. 4c). As shown in FIG. 3, the triad of arrows X, Y and Z indicates the orientation in which the slider 21 is viewed. Concretely, the slider 21 includes an air bearing surface (ABS) 21a, an opposite surface (not shown) opposite to the ABS 21a, a trailing edge 21b in which a magnetic head (not shown) is embedded, a leading edge (not shown) opposite to the trailing edge 21b, and two sides 21c, 21d. μDSA or LDU 22 is located at two sides 21c, 21d of the slider 21. A first plurality bonding pads 251 are formed at the trailing edge 21b of the slider 21, and a second plurality bonding pads 252 are formed at the surface of the suspension 23, the both of which are connected together via a plurality of solder joints 26 through a laser soldering operation perform on HGA 24 that relies on the use of a solder-jet nozzle 400 according to the present invention, the structure of which is next described in greater detail in the discussion of FIG. 4a-4d.

Figure 4D:
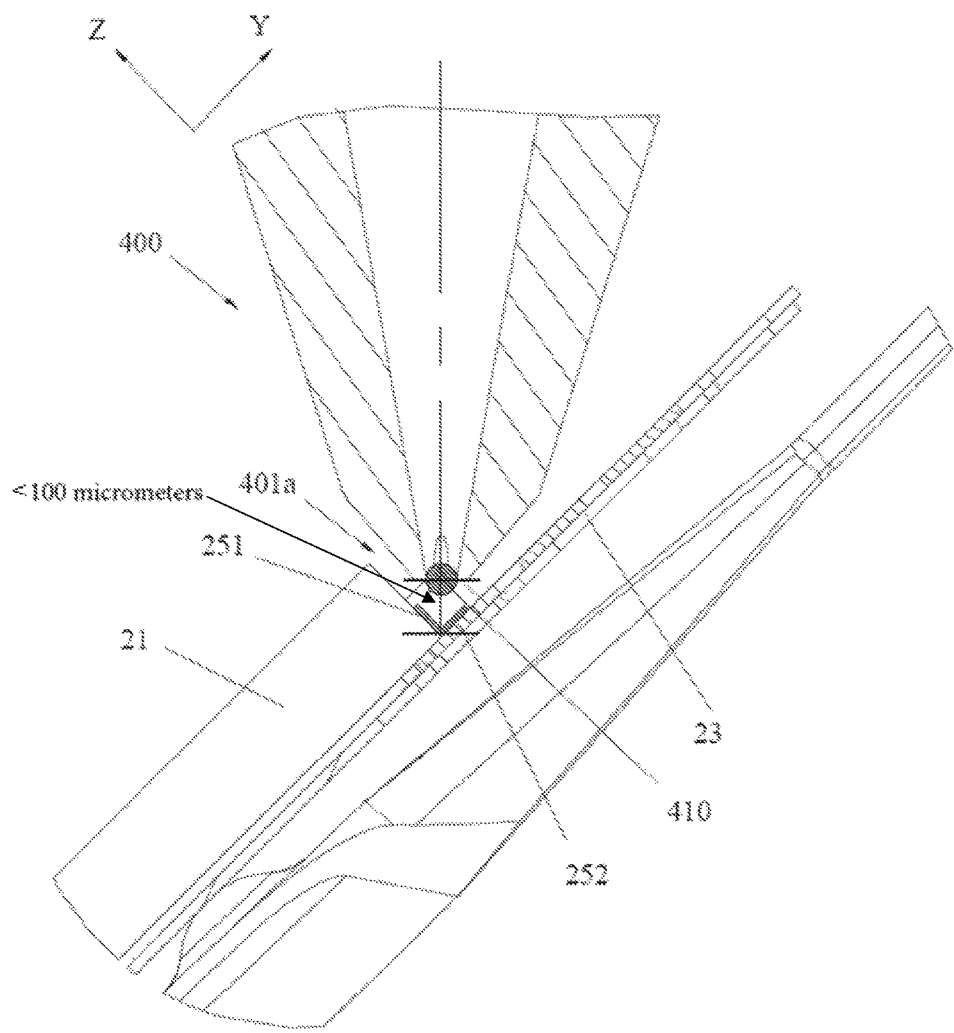
FIG. 4d is a drawing that shows a safety clearance between the tip of the solder-jet nozzle and the head bonding pads.

FIGS. 4a-4d show a solder-jet nozzle according to one embodiment of the present invention. Concretely, FIG. 4a is a cross section view of the solder-jet nozzle according to one embodiment of the present invention, FIG. 4b is a partial perspective view of a solder-jet nozzle; FIG. 4c is a drawing that shows the solder-jet nozzle according to the embodiment performs the solder bonding between the head bonding pads; and FIG. 4d shows a safety clearance between the tip of the solder-jet nozzle and the head bonding pads.

As shown in FIG. 4a, the solder-jet nozzle 400 includes a nozzle body 401, a central duct 402, and an outer surface 403 of the nozzle body 401. The nozzle body 401 includes a tip 401a that is disposed at a distal end of the nozzle body 401 and is configured to deliver a solder ball 410 in proximity to the head bonding pads 251, 252 of the HGA 24. As further shown in FIG. 4a, the central duct 402 is disposed on a central axis 401b of the nozzle body 401, and is configured to convey the solder ball 410 to the tip 401a. Thus, in accordance with embodiment of the present invention, the solder-jet nozzle 400 may include a capillary tube configured to transport the solder ball 410 in proximity to head bonding pads 251, 252 of HGA 24. A light beam form a laser device (not shown in this figure) is emitted through the central duct 402 to melt the solder ball 410 in the tip 401a.

In accordance with embodiment of the present invention, the tip 401a of the nozzle body 401 has interference-free structures formed thereon to reduce the outer circumference of the tip 401a so that no interference will happen between the tip 401a and the μDSA or LDU 22 aside during solder bonding. As shown in FIG. 4b, the tip 401a includes a front face 420a, a back face 420b, and two side faces 420c, 420d adjacent to the front face and back faces 420a, 420b respectively. Specifically, the orientations for the faces are defined relative to the HGA, when the nozzle 400 is positioned. Concretely, the front face 420a is defined to face to a trailing edge 21b of the slider 21, the back face 420b is defined to fact to the top surface of the suspension 23, the side faces 420c and 420d are defined to abut the front and back faces 420a and 420b. Such four faces 420a, 420b, 420c and 420d constitute the outer surface 403 of the tip 401a and form a non-continuous smoothing surface.

As shown, the four faces 420a, 420b, 420c and 420d are four chamfer-cuts served as interference-free structure. Specifically, the chamfer-cuts at the side faces 420c and 420d are formed by cutting a portion of the tip 401a, and an angle between each chamfer-cut at the side face 420c or 420d and the central axis of the nozzle body 401 is in a range of approximately 20°-40°. Preferably, two chamfer-cuts at the side faces 420c and 420d are symmetrical, and form an angle in a range of approximately 40°-80°, more preferably the angle is 50° in this embodiment. Such chamfer-cut on the side face 420c and/or 420d is aiming at avoiding interference between the tip 401a and the μDSA or LDU 22 at the sides of the slider 21 as shown in FIG. 4c, and keeping safe clearance distanced to the μDSA or LDU 22.

Preferably, chamfer-cuts on the front and back faces 420a and 420b are also beneficial to avoid interferences happened between the tip 401a and the trailing edge 21b of the slider 21, and between the tip 401a and the surface of the suspension 23, as shown in FIG. 4d.

Combining with FIGS. 4c-4d, advantages and benefits of the nozzle 400 with interference-free structures are explained and shown clearly. As shown, the solder-jet nozzle 400 is positioned in proximity to the trailing edge 21b of the slider 21 to start the solder bonding, owing to the interference-free structures (chamfer-cut) formed on the tip 401a of the nozzle body 401, thus the outer circumference of the tip 401a is reduced by comparison with the prior art and without no damage to the central duct, which brings no interference between the tip 401a and the elements/portion (such as μDSA, LDU, trailing edge, and the like) adjacent to the slider 21. Such that, the safety clearance between the tip 401a and the elements/portions adjacent to the slider 21 can be maintained, which improves the precision and alignment for soldering, improves the assembly efficiency and yield for the HGA therefore, and saves assembly or manufacturing cost meanwhile. In this embodiment, the safety clearance between the tip 401a of the solder-jet nozzle 400 and the head bonding pad is less than 100 μm as shown in FIG. 4d.

Figure 5A:
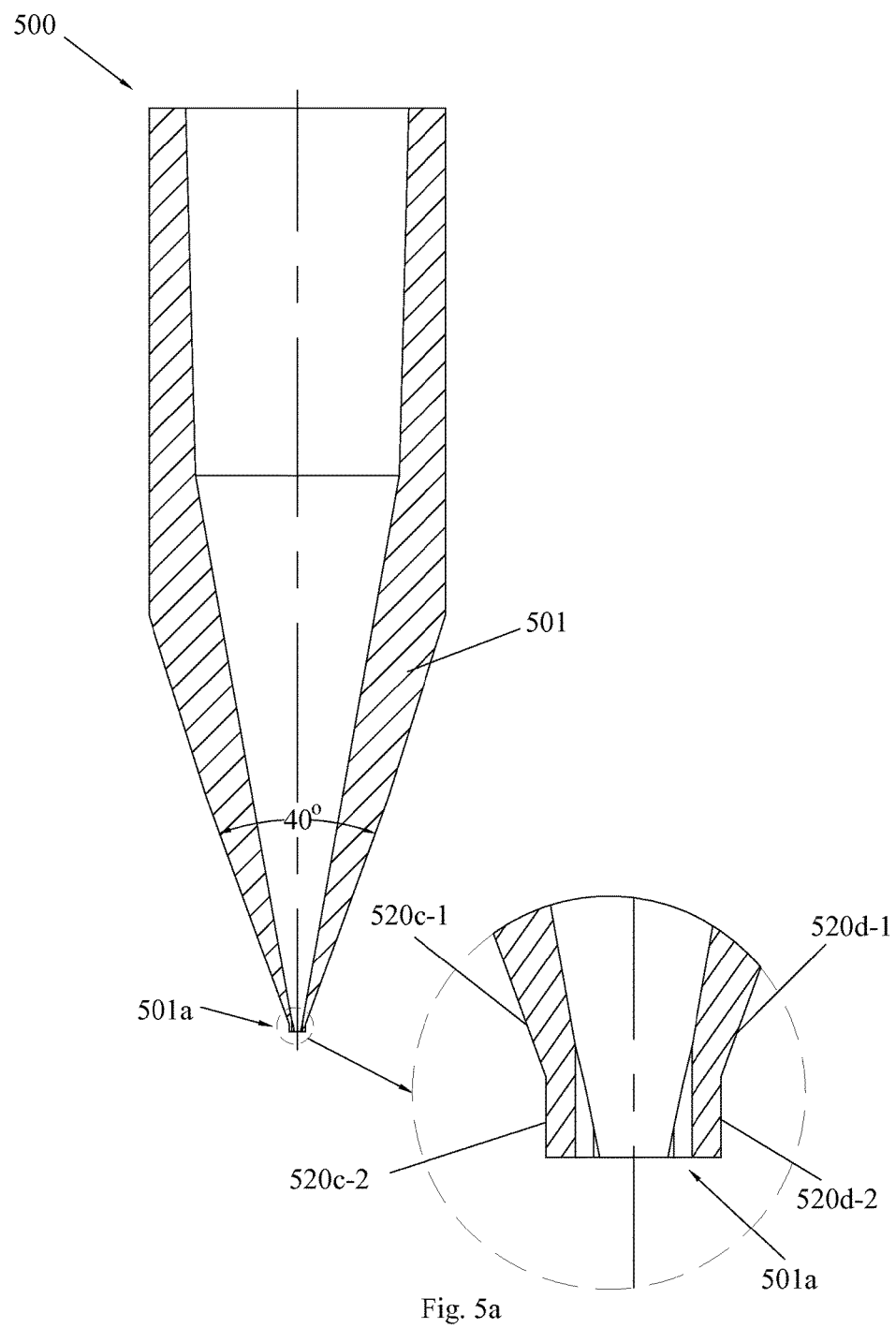
FIG. 5a is a cross section view of the solder-jet nozzle according to a second embodiment of the present invention.
Figure 5B:
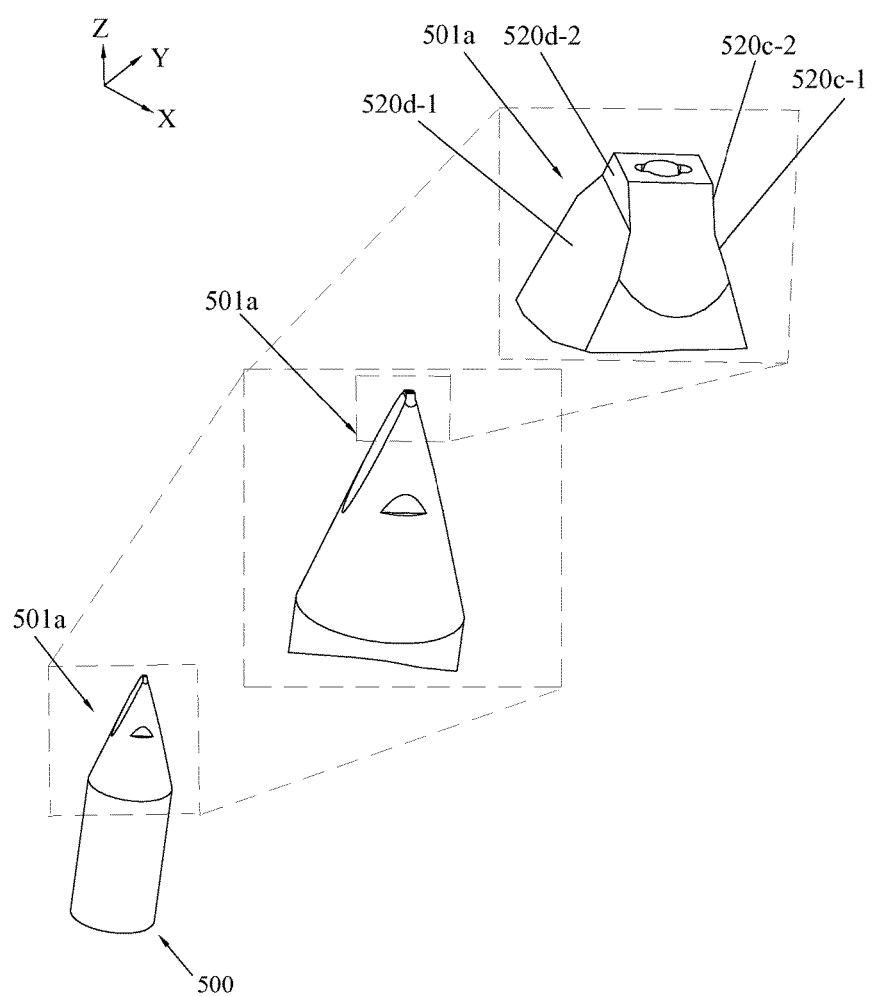
FIG. 5b is a partial perspective view of a solder-jet nozzle according to the second embodiment of the present invention.

As a second embodiment shown in FIG. 5a-5b, a solder-jet nozzle 500 includes the interference-free structure further including a step-cut formed on the outermost of the chamfer-cut at the side faces. As shown, the side face 520c includes a chamfer-cut 520c-1 and a vertical step-cut 520c-2 formed on the outermost. As similar, the side face 520 also includes a chamfer-cut 520d-1 and a vertical step-cut 520d-2 formed on the outermost. Two interference-free structures at the both sides are substantially symmetrical. Specifically, the angle between the two chamfer-cuts 520c-1 and 520d-1 in this embodiment is 40 degree, and the width tip in this embodiment is 0.12 mm preferably, in a range of approximately 0.06 mm-0.15 mm optionally.

Other structures of the solder-jet nozzle 500 are similar to that one shown on the nozzle 400 in the embodiment mentioned above, thus detailed description is not repeated hereto.

Owing to the interference-free structures (chamfer-cut and step-cut) formed on the tip 501a of the nozzle body 501, thus the outer circumference of the tip 501a is reduced by comparison with the prior art and without no damage to the central duct, therefore the tip does not interfere with the elements/portion (such as μDSA, LDU, trailing edge, and the like) adjacent to the slider 21. Such that, the safety clearance between the tip and the elements/portions adjacent to the slider 21 can be maintained, which improves the precision and alignment for soldering, improves the assembly efficiency and yield for the HGA therefore, and saving assembly or manufacturing cost meanwhile.

It should be noted that, the first embodiment is related to a slot-less solder-jet nozzle 400, and the second embodiment is related to a single slot solder-jet nozzle 500. However, the interference-free structure with chamfer-cut and/or step-cut is not limited to the embodiments mentioned above, it should be understood to persons ordinarily skilled in the art that the interference-free structure is applicable to all types of solder-jet nozzle, without limitation hereto.

A solder-reflow nozzle 600 with interference-free structure in accordance with the present invention is shown in FIGS. 6a-6d. As well known to person skilled in the art, the solder-reflow nozzle 600 includes a nozzle body 601, a central duct 602, and an outer surface 603 of the nozzle body 601. The nozzle body 601 includes a tip 601a that is disposed at a distal end of the nozzle body 601 and is configured to reflow a row of solder balls 610 in proximity to the head bonding pads 251, 252 of the HGA 24. Accordingly, an outlet 601c with a row of holes for passing the melted solder balls 610 is formed on the tip 601a. As further shown in FIG. 6a, the central duct 602 is disposed on a central axis 601b of the nozzle body 601, and is configured to absorb and convey the solder ball 610 from the tip 601a. Thus, in accordance with embodiment of the present invention, a light beam form a laser (not shown in this figure) is emitted through the central duct 602 to melt the solder balls 610 on the bonding pads 251, 252, and then the melted solder balls 610 will be absorbed from the tip 601a. The solder-reflow nozzle 600 may include a capillary tube configured to transport the reflowing solder ball 610 out of the central duct 602.

Figure 6A:
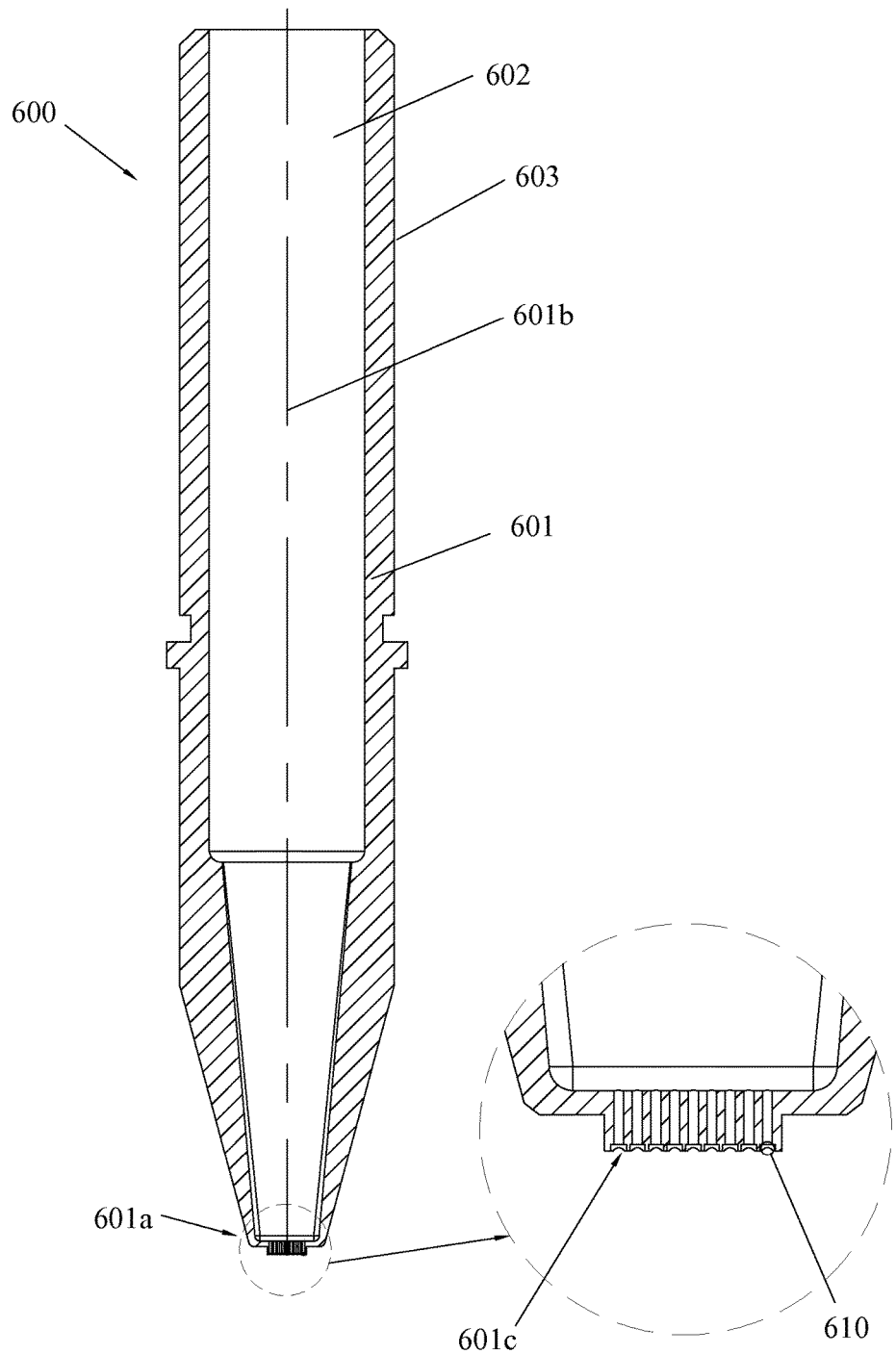
FIG. 6a is a cross section view of the solder-reflow nozzle according to a first embodiment of the present invention.
Figure 6B:
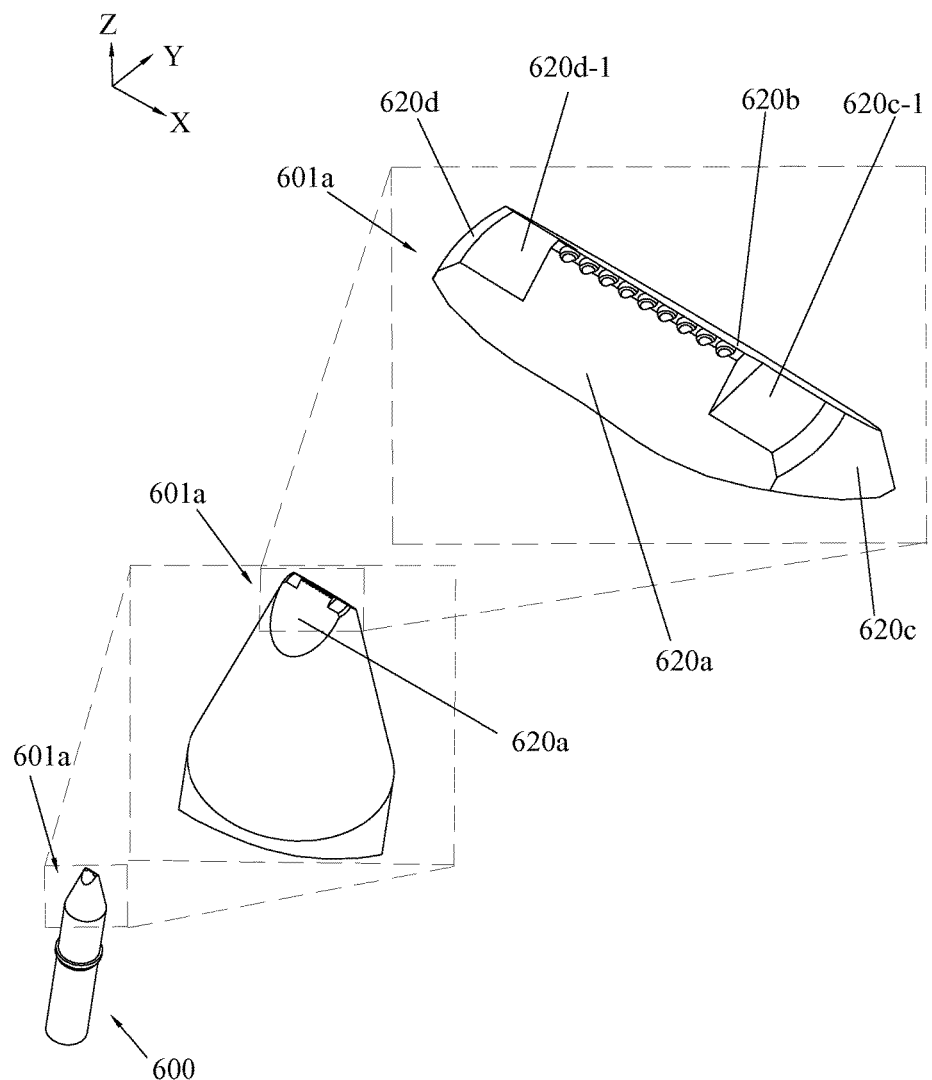
FIG. 6b is a partial perspective view of a solder-reflow nozzle according to the first embodiment of the present invention.

In accordance with embodiment of the present invention, the tip 601a of the nozzle body 601 has interference-free structures formed thereon to reduce the outer circumference of the tip so that no interference will happen between the tip 601a and the μDSA or LDU 22 aside during solder reflowing. As shown in FIG. 6b, the tip 601a includes a front face 620a, a back face 620b, and two side faces 620c, 620d adjacent to the front face and back faces 620a, 620b respectively. Concretely, the front and back faces 620a and 620b are chamfer-cut surfaces, and the side faces 620c and 620d are arc surfaces. Within the contemplation of the invention, two step-cuts 620c-1 and 620d-1 with predetermined depth are formed at the two side faces 620c and 620d, along the X direction. Such that, the width of the tip 601a in the X direction is reduced owing to the step-cuts 620c-1 and 620d-1. Optionally, each step-cut has a depth in a range of approximately 0.10 mm-0.25 mm, preferably is 0.15 mm in this embodiment.

Figure 6C:
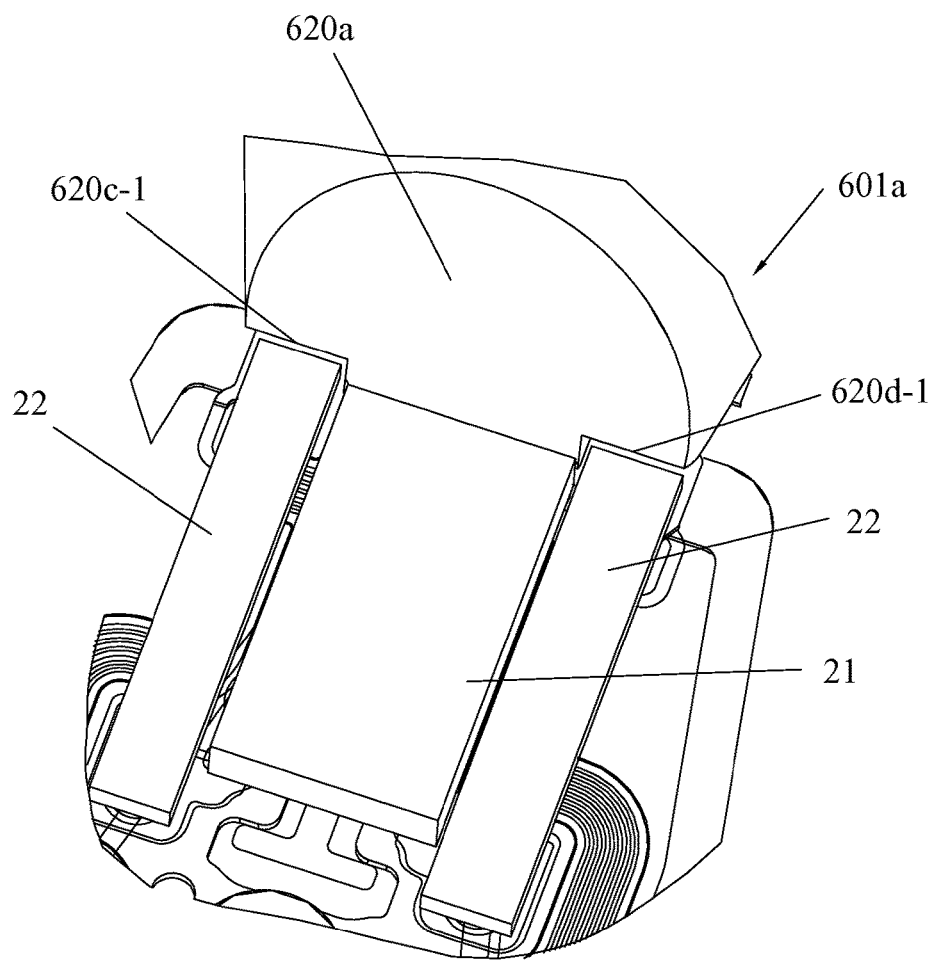
FIG. 6c is a drawing that shows the solder-reflow nozzle according to the embodiment performs the solder bonding between the head bonding pads
Figure 6D:
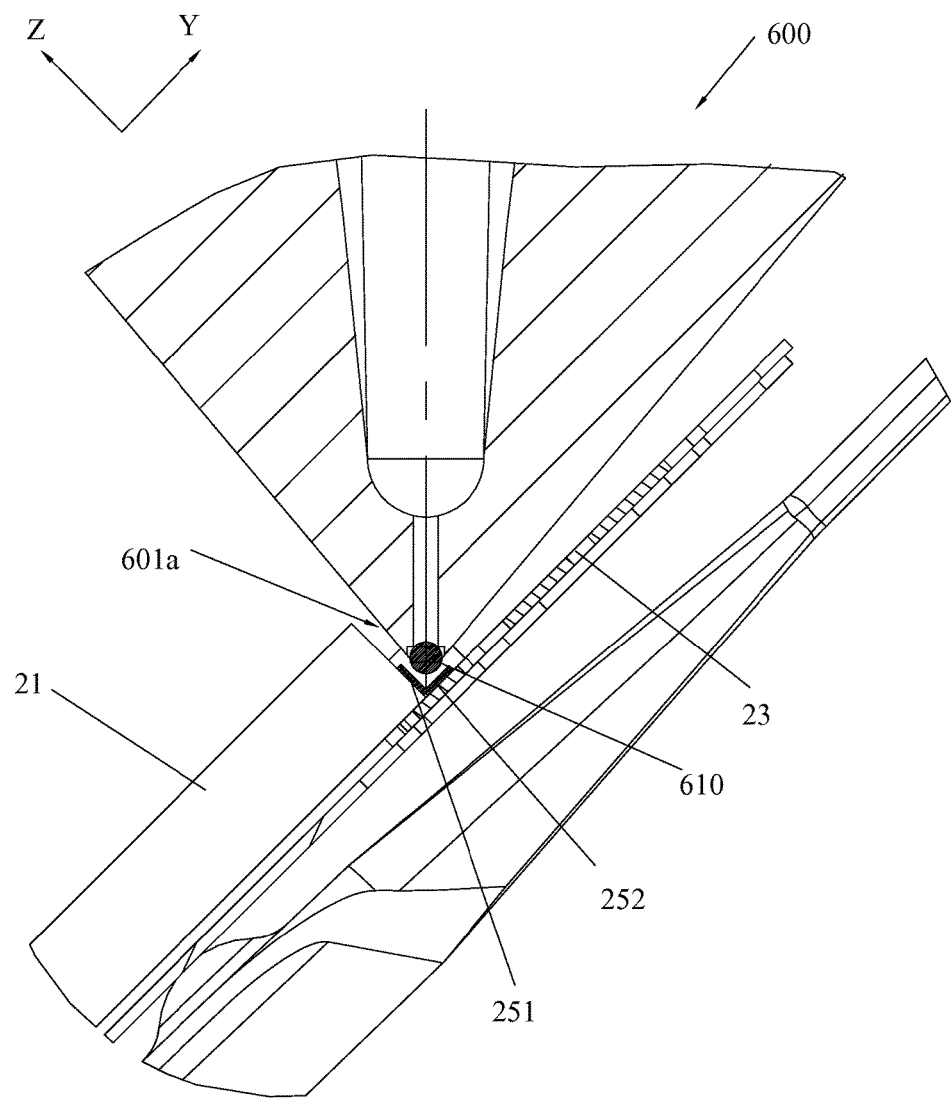
FIG. 6d is a drawing that shows a safety clearance between the tip of the solder-reflow nozzle and the head bonding pads.

Combining with FIGS. 6c-6d, advantages and benefits of the nozzle 600 with interference-free structures are explained and shown clearly. As shown, the solder-reflow nozzle 600 is positioned in proximity to the trailing edge 21b of the slider 21 to start the solder reflowing, owing to the interference-free structures (step-cut) formed on the tip 601a of the nozzle body 601 in the X direction, thus the width and outer circumference of the tip is reduced by comparison with the prior art, which brings no interference between the tip and the elements/portion (such as μDSA, LDU, trailing edge, and the like) adjacent to the slider 21, during reflowing operation. FIG. 6c shows a safety clearance of 0.02 mm between the tip and the elements/portions adjacent to the slider 21 can be maintained, which protects the adjacent elements from damaging, improves the reflowing precision, improves the repairing efficiency and yield for the HGA therefore, and saving repairing cost meanwhile. In this embodiment, the safety clearance between the tip 601a of the solder-jet nozzle 600 and the head bonding pad is less than 25 μm, as shown in FIG. 6d.

Figure 7A:
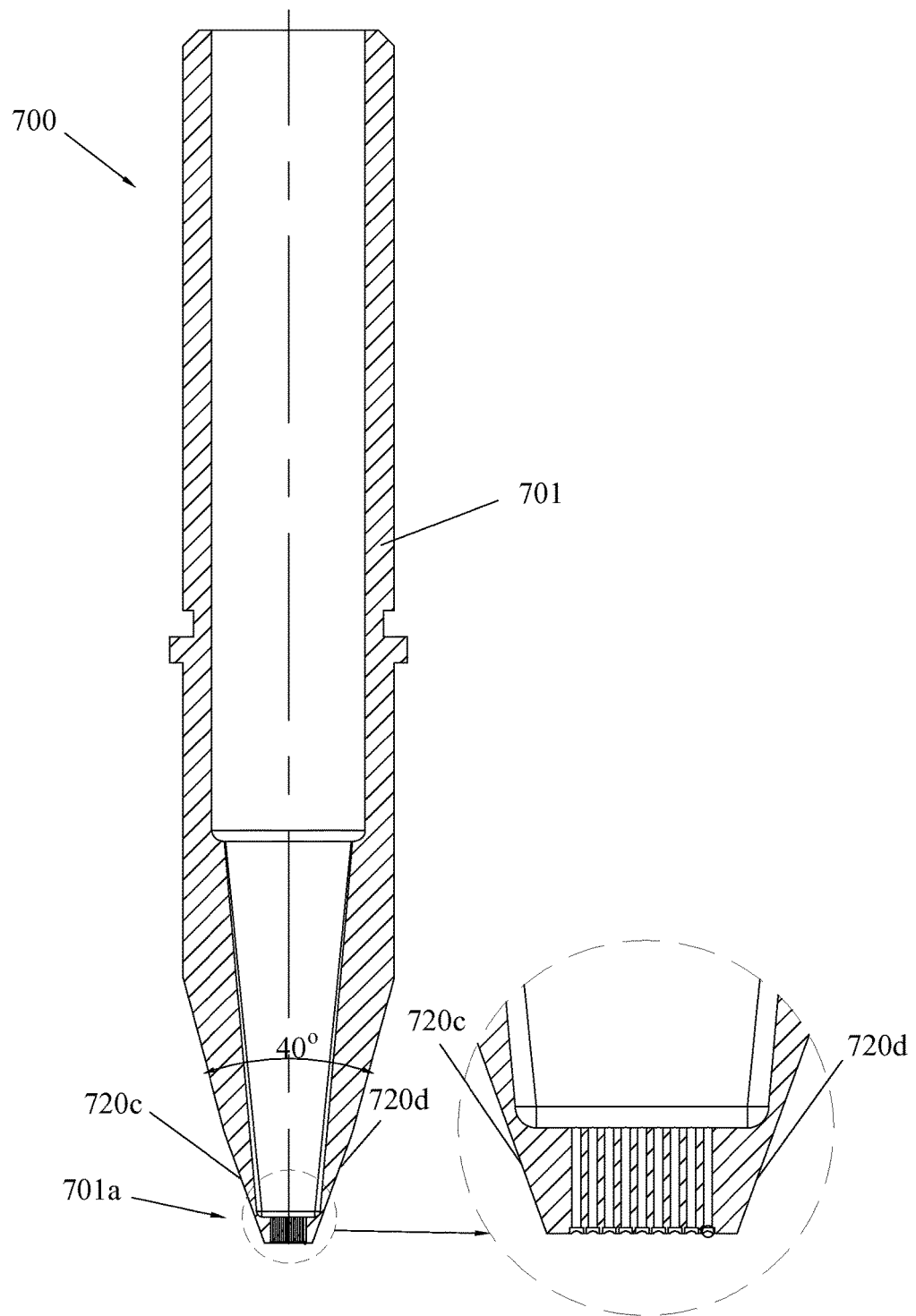
FIG. 7a is a cross section view of a solder-reflow nozzle according to a second embodiment of the present invention.
Figure 7B:
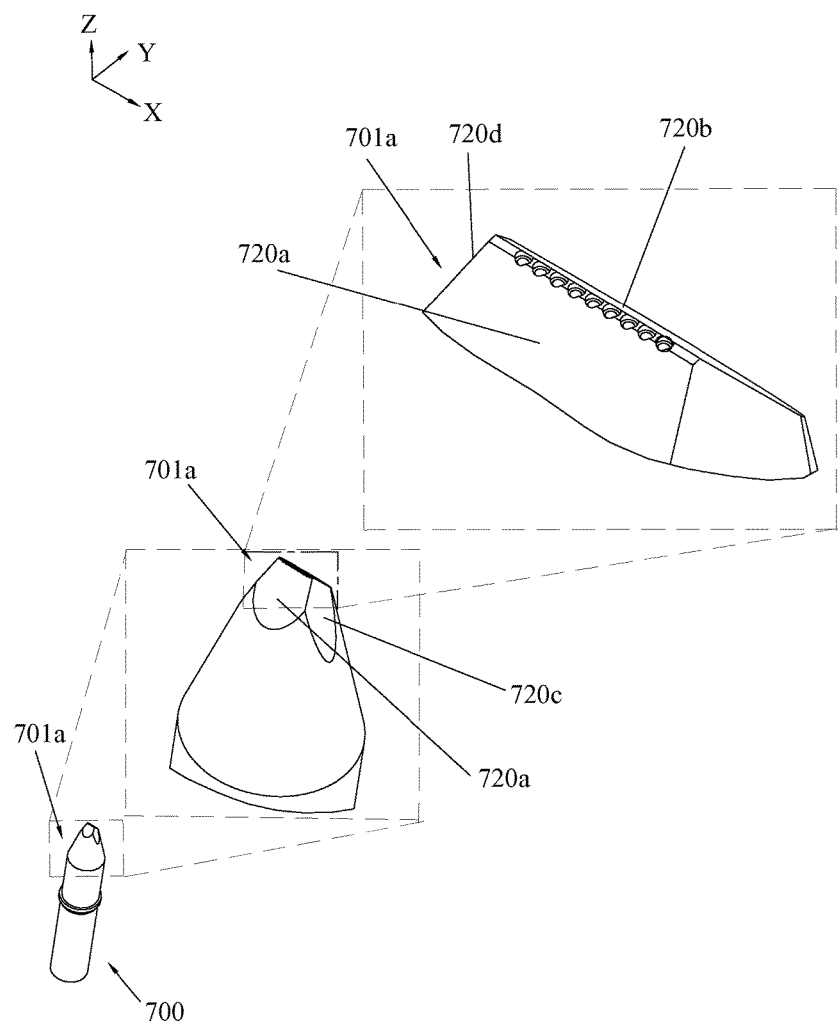
FIG. 7b is a partial perspective view of a solder-reflow nozzle according to the second embodiment of the present invention.
Figure 8A:
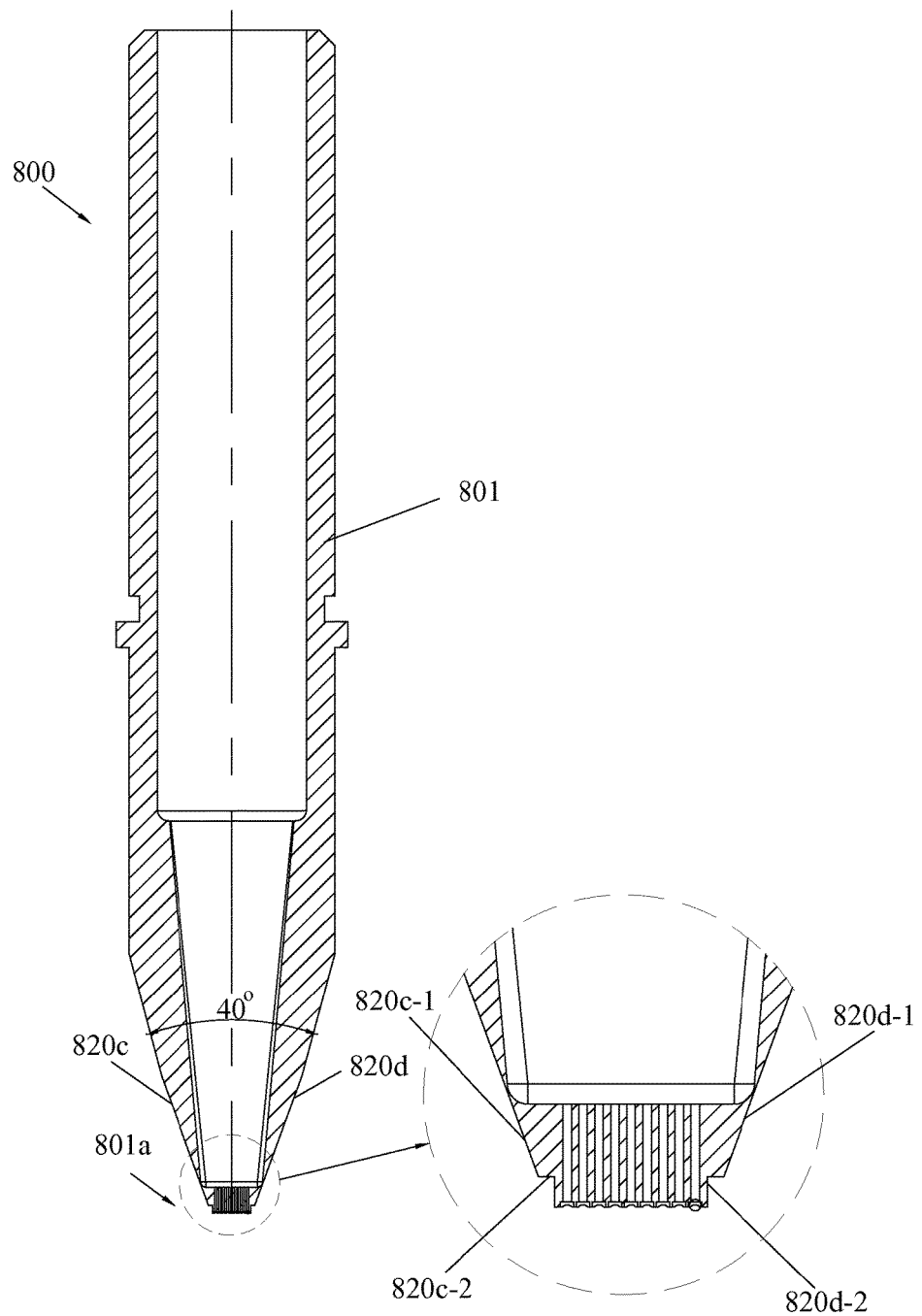
FIG. 8a is a cross section view of the solder-reflow nozzle according to a third embodiment of the present invention.
Figure 8B:
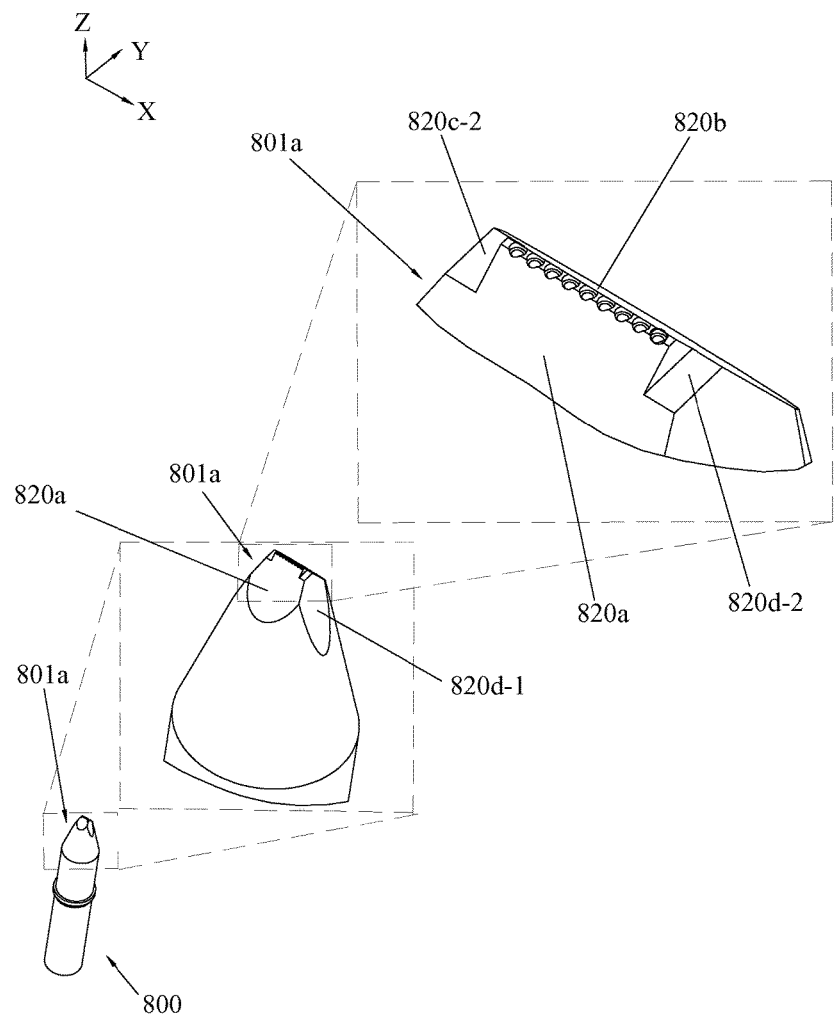
FIG. 8b is a partial perspective view of a solder-reflow nozzle according to the third embodiment of the present invention.

FIG. 7a-7b shows a second embodiment of the solder-reflow nozzle 700 according to the present invention. Basic structures of the nozzle 700 are similar to the nozzle 600 in the first embodiment, and difference is merely in the tip configuration. In this embodiment, the tip 701a of the solder-reflow nozzle 700 includes a front face 720a, a back face 720b, and two side faces 720c, 720d adjacent to the front face and back faces 720a, 720b respectively. Concretely, the four faces 720a, 720b, 720c and 720d are chamfer-cut surfaces which are served as interference-free structure. Specially, the chamfer-cuts at the side faces 720c and 720d are beneficial to reduce the width of the tip 701a in X direction. Preferably, the angle formed by the chamfer-cuts at side faces 720c and 720d is 40 degree in this embodiment, or other degree. As such, the width and outer circumference of the tip 701a is reduced by comparison with the prior art, which brings no interference between the tip and the elements/portion (such as μDSA, LDU, trailing edge, and the like) adjacent to the slider, during reflowing operation.

As an improved embodiment based on the embodiment shown in FIG. 7a-7b, FIG. 8a-8b shows a solder-reflow nozzle 800 includes the interference-free structure further including a step-cut formed on the outermost of the chamfer-cuts at the side faces 820c and 820d. As shown, the side face 820c includes a chamfer-cut 820c-1 and a step-cut 820c-2 formed on the outermost. As similar, the side face 820d also includes a chamfer-cut 820d-1 and a step-cut 820d-2 formed on the outermost. Specifically, the two step-cuts 820c-2 and 820d-2 are formed in the X direction of the nozzle 800, the depth of the step-cuts 820c-2 and 820d-2 is in a range of mm approximately 0.10 mm-0.25 mm. As such, the width and outer circumference of the tip 801a is further reduced, which brings no interference between the tip and the elements/portion (such as μDSA, LDU, trailing edge, and the like) adjacent to the slider 21, during reflowing operation.

The nozzles described in the embodiments are used by combination with a laser device to constitute a laser soldering tool or laser reflowing tool, which is included within the spirit of the invention, no repeated description is shown hereto.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A nozzle for connecting or disconnecting solder joints between head bonding pads of a head gimbal assembly for a hard disk drive, comprising:
   a nozzle body including a tip, the tip disposed at a distal end of the nozzle body and configured to deliver or reflow a solder ball in proximity to the head bonding pads of the head gimbal assembly; and
   a central duct disposed along a central axis of the nozzle body and configured to convey the solder ball to or from the tip;
   wherein the tip comprises a front chamfer-cut surface, a back chamfer-cut surface, and two side faces abutting both the front chamfer-cut surface and back chamfer-cut surface, and at least one interference-free structure is provided at the side faces of the tip, such that the tip does not interfere with elements adjacent to the slider during the operation, wherein the interference-free structure includes a step-cut having a recess formed on each side face of the tip along a width direction of the tip, thereby reducing width of the tip.

2. The nozzle according to claim 1, wherein the interference-free structure includes a chamfer-cut formed on the side faces of the tip.

3. The nozzle according to claim 2, wherein the step-cut is formed on an outermost portion of the chamfer-cut of the interference-free structure.

4. The nozzle according to claim 2, wherein an angle between the chamfer-cut of the interference-free structure and the central axis of the nozzle body is in a range of approximately 20°-40°.

5. The nozzle according to claim 3, wherein an angle between the chamfer-cut of the interference-free structure and the central axis of the nozzle body is in a range of approximately 15°-30°.

6. The nozzle according to claim 1, wherein the step-cut has a depth in a range of approximately 0.10 mm-0.25 mm.

7. The nozzle according to claim 1, wherein the nozzle is adapted for the slider having piezoelectric elements or laser diode units on sides of the slider.

8. A laser soldering or reflowing tool for connecting or disconnecting solder joints between head bonding pads of a head gimbal assembly for a hard disk drive, comprising:

a laser device; and a nozzle comprising:

a nozzle body including a tip, the tip disposed at a distal end of the nozzle body and configured to deliver or reflow a solder ball in proximity to the head bonding pads of the head gimbal assembly; and a central duct disposed along a central axis of the nozzle body and configured to convey the solder ball—to or from the tip;

wherein the tip-comprises a front chamfer-cut surface, a back chamfer-cut surface, and two side faces abutting the front chamfer-cut surface and back chamfer-cut surface respectively, and at least one interference-free structure is provided at the side faces of the tip, such that the tip does not interfere with elements adjacent to the slider during the operation, wherein the interference-free structure includes a step-cut having a recess formed on each side face of the tip along a width direction of the tip, thereby reducing width of the tip.

* * * * *